US012356499B2

(12) United States Patent
Goodsitt et al.

(10) Patent No.: US 12,356,499 B2
(45) Date of Patent: Jul. 8, 2025

(54) SYSTEMS AND METHODS FOR GENERATING REAL-TIME LOCATION-BASED NOTIFICATIONS

(71) Applicant: Capital One Services, LLC, McLean, VA (US)

(72) Inventors: Jeremy Goodsitt, Champaign, IL (US); Galen Rafferty, Mahomet, IL (US); Samuel Sharpe, Cambridge, MA (US); Brian Barr, Schenectady, NY (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 428 days.

(21) Appl. No.: 18/054,114

(22) Filed: Nov. 9, 2022

(65) Prior Publication Data

US 2024/0155732 A1     May 9, 2024

(51) Int. Cl.
*H04W 76/40*     (2018.01)
*G06F 21/60*     (2013.01)
*H04L 9/32*     (2006.01)

(52) U.S. Cl.
CPC .......... *H04W 76/40* (2018.02); *G06F 21/602* (2013.01); *H04L 9/3213* (2013.01)

(58) Field of Classification Search
CPC .... H04W 76/40; G06F 21/602; H04L 9/3213; H04L 9/3234; H04L 9/14; H04L 63/061
See application file for complete search history.

(56) References Cited

U.S. PATENT DOCUMENTS

| | | | |
|---|---|---|---|
| 11,489,669 B1* | 11/2022 | Rafanavičius | H04L 9/0891 |
| 11,520,873 B2* | 12/2022 | Lajoie-Mazenc | H04L 9/3234 |
| 11,683,159 B2* | 6/2023 | Lidzborski | G06F 21/30 |
| | | | 713/159 |
| 2024/0163081 A1* | 5/2024 | Bosworth | H04L 63/065 |

* cited by examiner

*Primary Examiner* — Chandrahas B Patel
(74) *Attorney, Agent, or Firm* — Foley & Lardner LLP

(57) ABSTRACT

Systems and methods for generating real-time location-based notifications are described. In some aspects, the system processes, using a first machine learning model, a real-time video stream to determine a measure of significance of an event depicted in the real-time video stream. The system determines whether the user was present at the event. Based on determining that the user was present at the event, the system processes a user profile for the user and the measure of significance of the event to determine whether to generate for the user a cryptographic token associated with the event. Based on determining to generate for the user the cryptographic token associated with the event, the system generates a notification to the user including information for accessing the cryptographic token for the user.

20 Claims, 5 Drawing Sheets

SYSTEMS AND METHODS FOR GENERATING REAL-TIME LOCATION-BASED NOTIFICATIONS

SUMMARY

Methods and systems are described herein for novel uses and/or improvements to artificial intelligence applications. As one example, methods and systems are described herein for detecting significant events within a real-time video stream received from a platform and determining whether one or more users of the platform would be interested in receiving cryptographic tokens related to these events.

Conventional systems do not provide capabilities to tailor generation of cryptographic tokens to personal interests for users of a particular platform, nor do they use the relation of the user to a significant event as a consideration for generating cryptographic tokens to offer to the user. For example, conventional systems may identify a video clip from a source using viewership statistics or other aggregated data. However, they do not provide capabilities to detect significant events within a real-time video or correlate interest levels to characteristics of users like subscriptions and memberships corresponding to the video stream to determine user interest in cryptographic tokens related to these events. Further, the difficulty in adapting artificial intelligence models for this practical benefit faces several technical challenges such as selecting and gathering input data to models for customizing the suitability of cryptographic tokens to individual users, incorporating real-time location data into the consideration of whether to generate cryptographic tokens, or even using real-time audience information to inform whether to generate cryptographic tokens.

To overcome these technical deficiencies in adapting artificial intelligence models for this practical benefit, methods and systems disclosed herein leverage one or more data sources to determine a measure of significance for events in a real-time video stream and use the user's real-time presence and/or enthusiasm metrics to gauge interest in receiving a cryptographic token related to a significant event. For example, the system may consider the user's location in addition to their relations to the platform of the event and the event itself to determine whether to generate cryptographic tokens for the user. Accordingly, the methods and systems may drive user engagement for the video stream's platform by anticipating enthusiasm for significant events and using cryptographic tokens to reward users.

In some aspects, methods and systems are described herein comprising: processing, using a first machine learning model, a real-time video stream to determine a measure of significance of an event depicted in the real-time video stream; at a subsequent time, based on detecting that a current location of a user is in proximity of a location of the event, determining whether the user was present at the location during a portion of the event; based on determining that the user was present at the location during the portion of the event, processing a user profile for the user and the measure of significance of the event to determine whether to generate for the user a cryptographic token associated with the event; and based on determining to generate for the user the cryptographic token associated with the event, generating a notification to the user including information for accessing the cryptographic token for the user.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1A:
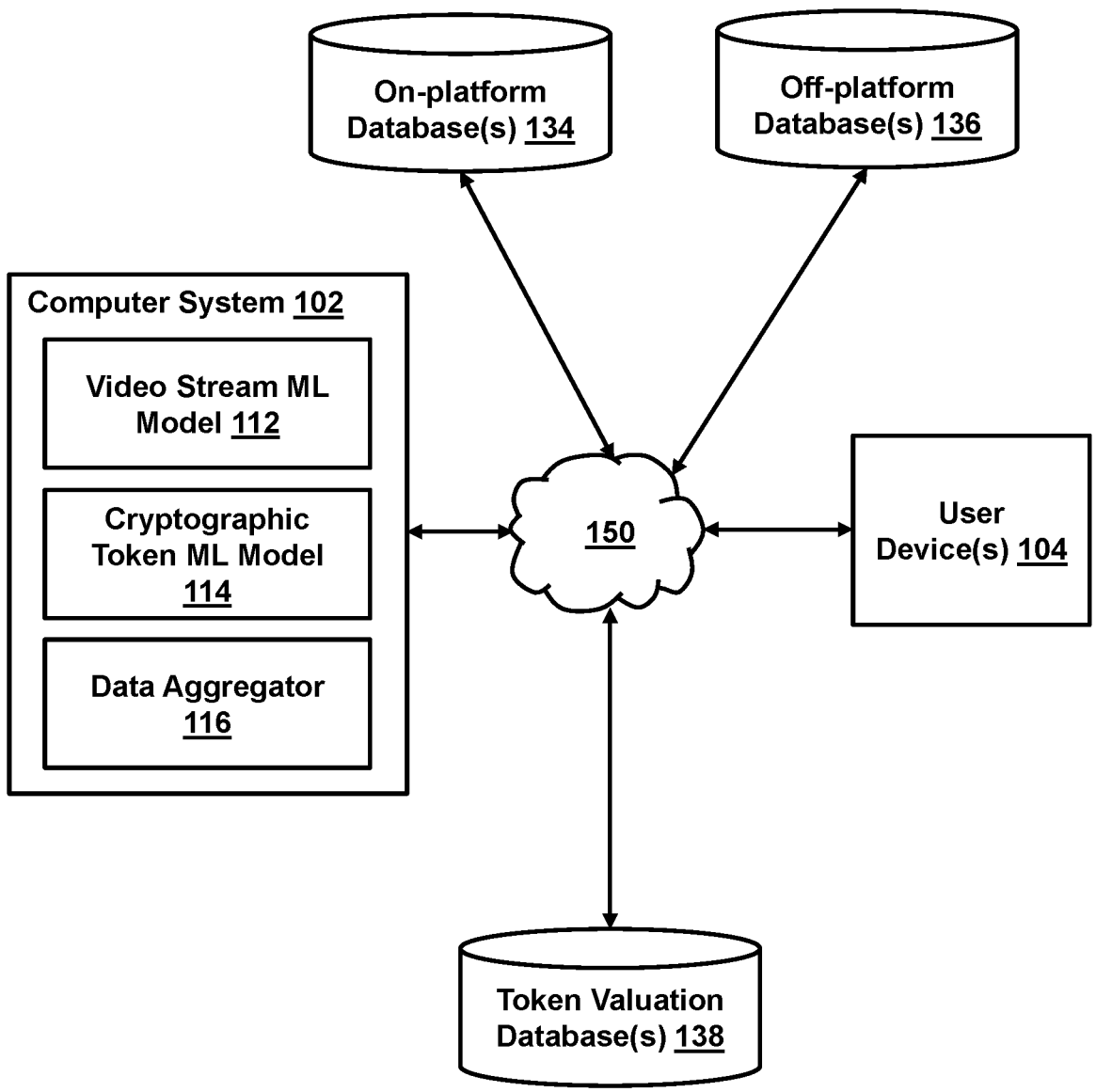
FIG. 1A shows an illustrative diagram for detecting user presence at events and calculating measures of significance to generate cryptographic tokens, in accordance with one or more embodiments.

FIG. 1A shows an illustrative diagram for generating measures of significance for events in video streams and determining generation of cryptographic tokens, in accordance with one or more embodiments. For example, Computer System 102 may include Video Stream ML Model 112, Cryptographic Token ML Model 114, and Data Aggregator 116, which interface and communicate with the other components of system 150 (the system).

For example, FIG. 1A illustrates a Data Aggregator 116, which may collect metadata regarding locations (including streaming platforms), events or video streams taking place at locations, users and cryptographic tokens. For example, Data Aggregator 116 may, in real-time, collect off-platform commentary data discussing an event taking place at a location from known sources. As referred to herein, a "platform" may refer to a physical location, a streaming service, a TV station or any real or virtual venue which may host video streams. Platforms may correspond to one or more data sources. For example, a streaming platform like YouTube may have a viewership log detailing what each user watched at a given time. Television channels and stations also have servers storing viewership statistics.

For example, for an ongoing soccer game, Data Aggregator 116 may retrieve a transcript of the commentary from sports broadcasters which may be available on television or through radio. In addition, Data Aggregator 116 may retrieve from social media discussions of the soccer game via keyword searches through, for example, a web scraper application programming interface. In another example, for a video stream on a streaming platform (e.g., Twitch), Data Aggregator might access the real-time chat log of the video stream in addition to discussions on social media outlets. The data sources which provide such off-platform data, the software and hardware components used to communicate with the data sources, and the datasets retrieved therefrom may be referred to as Off-platform Database(s) 136.

Data Aggregator 116 may also retrieve on-platform viewership and audience engagement data for an event depicted in the video stream. For example, viewership data may be the number of viewers of a twitch stream, or the occupancy of the stadium at a soccer game. Viewership data may further break down into categories: for example, how many watchers of a Twitch stream are subscribed, or how many fans at a soccer game are wearing merchandise of a team. Such on-platform data may be directly associated with the location of the event. Audience engagement data may be measured by, for example, how many comments or gifted subscriptions per second are made in a twitch stream, or noise level at a soccer game. A sudden uptick in views or in crowd motion may also indicate audience engagement. The data sources which provide such on-platform data, the software and hardware components used to communicate with the data sources, and the datasets retrieved therefrom may be referred to as On-platform Database(s) 134.

The system may combine the real-time video stream, the first on-platform dataset and the off-platform dataset into a feature vector. The feature vector may be a numerical representation, in a real-valued space, of the real-time video stream, the first on-platform dataset and the off-platform dataset. The system may input the feature vector into Video Stream ML Model 112. Video Stream ML Model 112 is trained to perform multi-class categorical prediction and quantitative prediction. The categorical prediction may indicate the amount of cryptographic tokens to be generated and the time delay from the end of the event to the generation of the cryptographic tokens. The quantitative prediction may be a numerical estimate for the interest in the event. Video Stream ML Model 112 may use one or more algorithms including multivariate regression, k-nearest neighbors, neural networks, and/or the like to generate the predictions. Video Stream ML Model 112 may output a measure of significance for an event, which is part of the consideration for whether to generate cryptographic tokens to a user. In some embodiments, the system may use the measure of significance to identify a significant event within a real-time video steam, including a start time and an end time. As referred to herein, a measure of significance may be a vector combined from a numerical estimate for the importance of an event in a real-time video stream and associated metadata. Such associated metadata may include but is not limited to a time after the end of the event at which cryptographic tokens may be generated, and the number of cryptographic tokens to be generated.

As referred to herein, a significant event may be a portion of a real-time video stream defined by a start time and an end time. The system may determine an event to be significant based on the measure of significance. For example, the system may compare numerical estimate for the importance of the event in the measure of significance against a threshold.

Data Aggregator 116 may continue to collect both on-platform and off-platform data after the ending time of the event. Using new data, both on-platform and off-platform, the system may re-calculate the measure of significance. If the revised measure of significance of the event indicates increased interest in the event relative to the original measure of significance, the system may elect to shorten the time period between an ending time of the event and generation of the cryptographic token and/or generate a greater amount of cryptographic tokens.

Data Aggregator 116 may collect location data to determine that the user was present at the event. Data Aggregator 116 may access global positioning system (GPS) location data of a mobile device of the user between a starting time and an ending time of the event through one or more mobile applications. For example, during a soccer game, Data Aggregator 116 may receive GPS data indicating the user was present in the venue. In some embodiments, Data Aggregator 116 may access the user's purchase history of tickets for the event.

Data Aggregator 116 may, for online events, retrieving from a server corresponding to the location a viewing history of the user at the location. For example, YouTube may record a watch history for users, and the system may access such a record to determine whether the user watched a particular live stream. In addition, Data Aggregator 116 may determine a relationship of the user to a platform and/or of the user to the event. For example, Data Aggregator 116 may determine that the user subscribes to Twitch Prime, or that the user is subscribed to a particular streamer associated with a video stream.

Data Aggregator 116 may combine the GPS location data, the viewing history, the relationship to the platform and to the event of the user into a user presence vector. The system may process the user presence vector using a program to determine whether the user was present at the location (e.g., geographical location, virtual location, or another suitable location) of the event during a portion of the event. In some embodiments, the program may include a set of deterministic rules. For example, if the GPS data shows the user was located at the physical location of a soccer game for more than 60% of the duration of the game, the user may be determined to have been "present" at the soccer game. In other embodiments, the system may use a model to determine whether the user was present at the location during the event. In some embodiments, users need to have been present at an event to be eligible to receive cryptographic tokens of that event.

In some embodiments, the determination of whether the user was present at an event is based entirely on their online viewing history. For example, for a Twitch stream taking place between 9:00 P.M. and 10:02 P.M. on Jun. 9, 2022, the system may access the viewing history of a user on Twitch between 9:00 P.M. and 10:02 P.M. on Jun. 9, 2022. The system may then combine the viewing history, the relationship of the user to Twitch and to the particular streamer into a user presence vector.

In addition to detecting the presence of the user at the event, the system may process the user profile of the user and the measure of significance of the event to determine whether to generate for the user the cryptographic token associated with the event. The user profile may include a viewing history of the user, a relationship of the user to a platform, a relationship of the user to the event, demographic information of the user, etc. The system may process the user profile to generate an interest matrix for the user, which may be a mathematical representation of the user profile. The system may then process, using a second machine learning model, the interest matrix and the measure of significance of the event to determine a probability the user will access the cryptographic token associated with the event.

The second machine learning model (e.g., Cryptographic Token ML Model 114) may perform quantitative prediction using an interest matrix and the measure of significance generated by Video Stream ML Model 112 for the event. Cryptographic Token ML Model 114 may use one or more algorithms including linear regression, neural networks, random forests and/or the like to generate a prediction for the probability of the user accessing the cryptographic token. This probability should be understood in the Bayesian sense, encapsulating the expectation for the user accessing the cryptographic token and may also indicate the likely extent to which the user will value the cryptographic token if they were to own it. In some embodiments, the system may compare the probability of the user accessing the cryptographic token against a preset threshold (e.g., 0.75). Additionally, the system may need to determine that the user was present at the event in order to generate cryptographic tokens.

When the system determines to generate for a user cryptographic tokens corresponding to an event, it may generate a notification to the user including information for accessing the cryptographic tokens. For example, the system may mint the cryptographic tokens (e.g., through a blockchain function on blockchain 208), and assign the cryptographic tokens to a cryptography-based storage application. The system may then communicate with an application on a user device to indicate an address for the cryptography-based storage application and instructions for generating one or more private keys of the cryptography-based storage application. When the user generates and obtains control of the private keys of the cryptography-based storage application, the user may control the cryptography-based storage application and own the cryptographic tokens therein. The system may record in a token valuation database (e.g., Token Valuation Database 134) that the cryptographic tokens have been assigned to the user.

After the cryptographic tokens have been assigned to the user, the system may continue to monitor the status of the cryptographic tokens over a period of time to determine a measure of appreciation for the cryptographic token. In some embodiments, the measure of appreciation may correspond to the volume of resale or the price of resale of the cryptographic token. Additionally or alternatively, the measure of appreciation may be weighed by the velocity and intensity of discussion surrounding the event after the ending time of the event. For example, Data Aggregator may retrieve data representative of the velocity and intensity of discussion from one or more sources (e.g., social media) which may be included in Off-platform Database(s) 136. The system may record the measure of appreciation of the cryptographic tokens in Token Valuation Database(s) 138. Token Valuation Database(s) 138 may be used as continuous training data for both Video Stream ML Model 112 and Cryptographic Token ML Model 114.

Figure 1B:
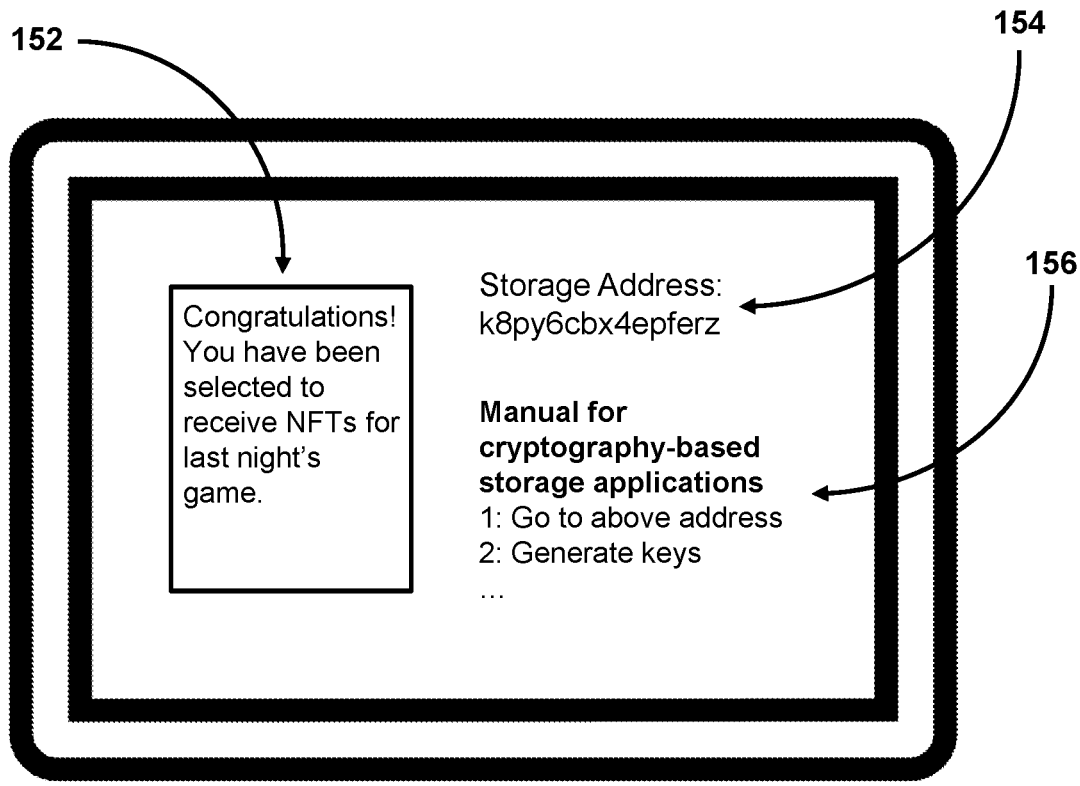
FIG. 1B shows an illustrative user interface for notifying the user of cryptographic tokens generated for their access.

FIG. 1B illustrates a user interface exemplifying notifications that may be sent to users informing them of cryptographic tokens generated for them. FIG. 1B shows a device screen with a user interface containing prompt 152, address 154 and instruction 156. Prompt 152 notifies the user that cryptographic tokens have been generated which are made available to them. In some embodiments, the cryptographic tokens are complimentary due to the user's associations with the event captured in the cryptographic tokens or the platform which hosted the event. For example, the user may have purchased tickets to a football game and included with the tickets may have been a cryptographic token depicting one event during the game. In some other embodiments, the user may have to purchase one or more cryptographic tokens. Address 154 may give the user access to a cryptographic address containing the cryptographic token. The address may be expressed as an alphanumeric string and may be accessed through the use device. The user device may run one or more applications capable with interfacing with a blockchain, allowing the user to access the cryptographic address. Instruction 156 may be a description of a set of steps through which the user may set up a cryptography-based storage application at the cryptographic address. For example, instruction 156 may advise the user to generate cryptographic keys which will grant them control over the cryptography-based storage application.

Figure 2:
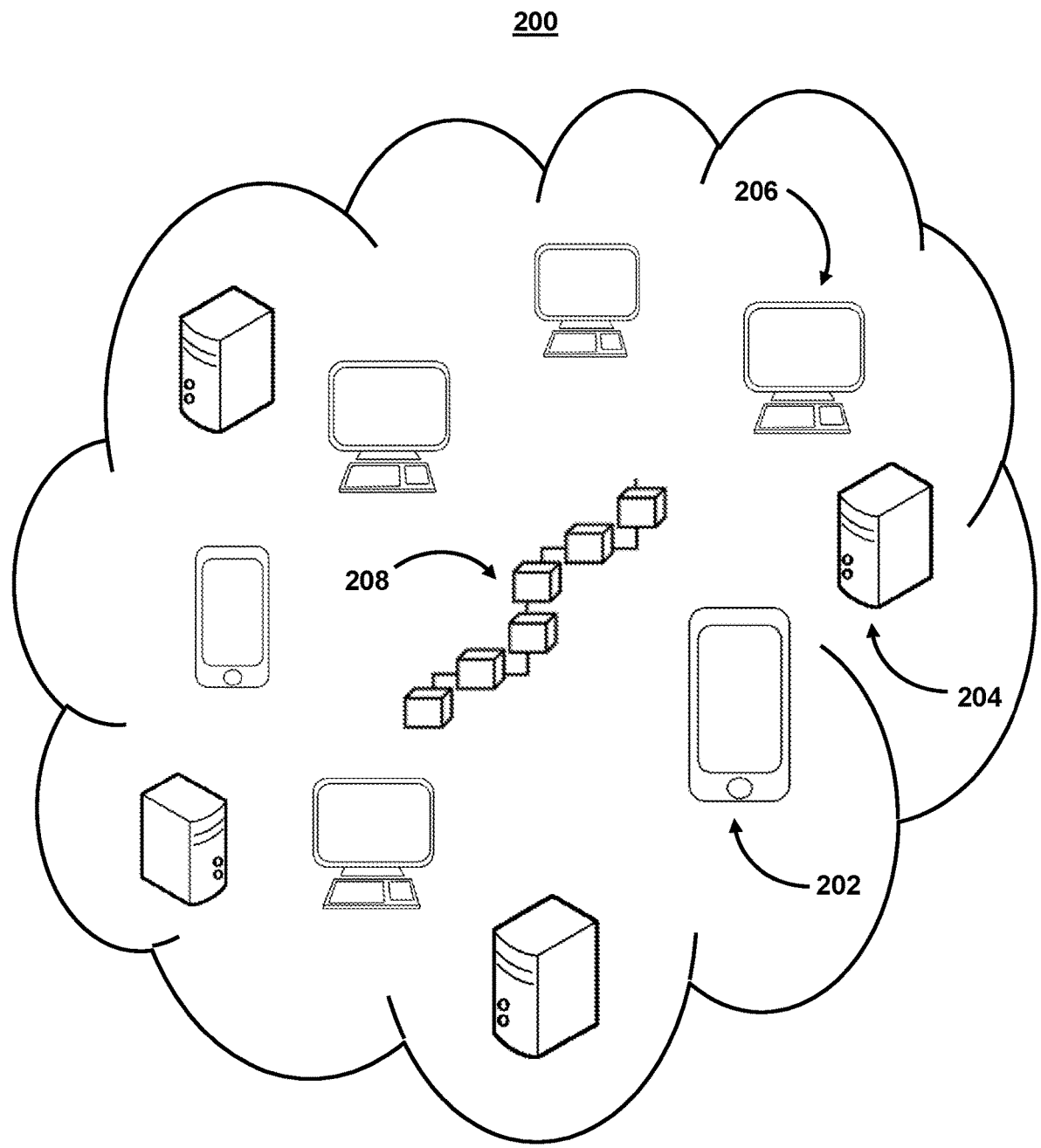
FIG. 2 shows an illustrative diagram for blockchain components capable of conducting blockchain functions like generating and transferring cryptographic tokens, in accordance with one or more embodiments.

FIG. 2 shows an illustrative diagram for a decentralized environment for performing blockchain functions, in accordance with one or more embodiments. For example, the diagram presents various components that may be used to mint and transfer cryptographic tokens in some embodiments.

As shown in FIG. 2, system 200 may include multiple user devices (e.g., user device 202, user device 202, and/or user device 206). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of, blockchain 208.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain function may equally be applied to, and correspond to, an individual user device (e.g., user device 202, user device 204, and/or user device 206) performing the blockchain function. That is, system 200 may correspond to the user devices (e.g., user device 202, user device 204, and/or user device 206) collectively or individually.

Each of the user devices may be used by the system to conduct blockchain functions and/or contribute to the generation and tracking of cryptographic tokens. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 2, one or more user devices may include a digital wallet used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain functions, while a cold wallet is generally used for managing a user account and may have no connection to the internet.

As shown in FIG. 2, one or more user devices may include a private key and/or digital signature. For example, system 200 may use cryptographic systems for conducting blockchain functions such as granting users control of cryptography-based storage applications. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may comprise a plurality of nodes for the blockchain network. Each node may correspond to a user device (e.g., user device 202). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine that the blockchain function is valid. In response to validation of the block, a node user device (e.g., user device 202, user device 204, and/or user device 206) in the community network (e.g., a miner) may receive a reward (e.g., in a given cryptocurrency) as an incentive for validating the block.

To validate the blockchain function, system 200 may use one or more validation protocols and/or validation (or consensus) mechanisms. For example, system 200 may use a POW mechanism in which a user device must provide evidence that it performed computational work to validate a blockchain function and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 200 may use a POS mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

Figure 3:
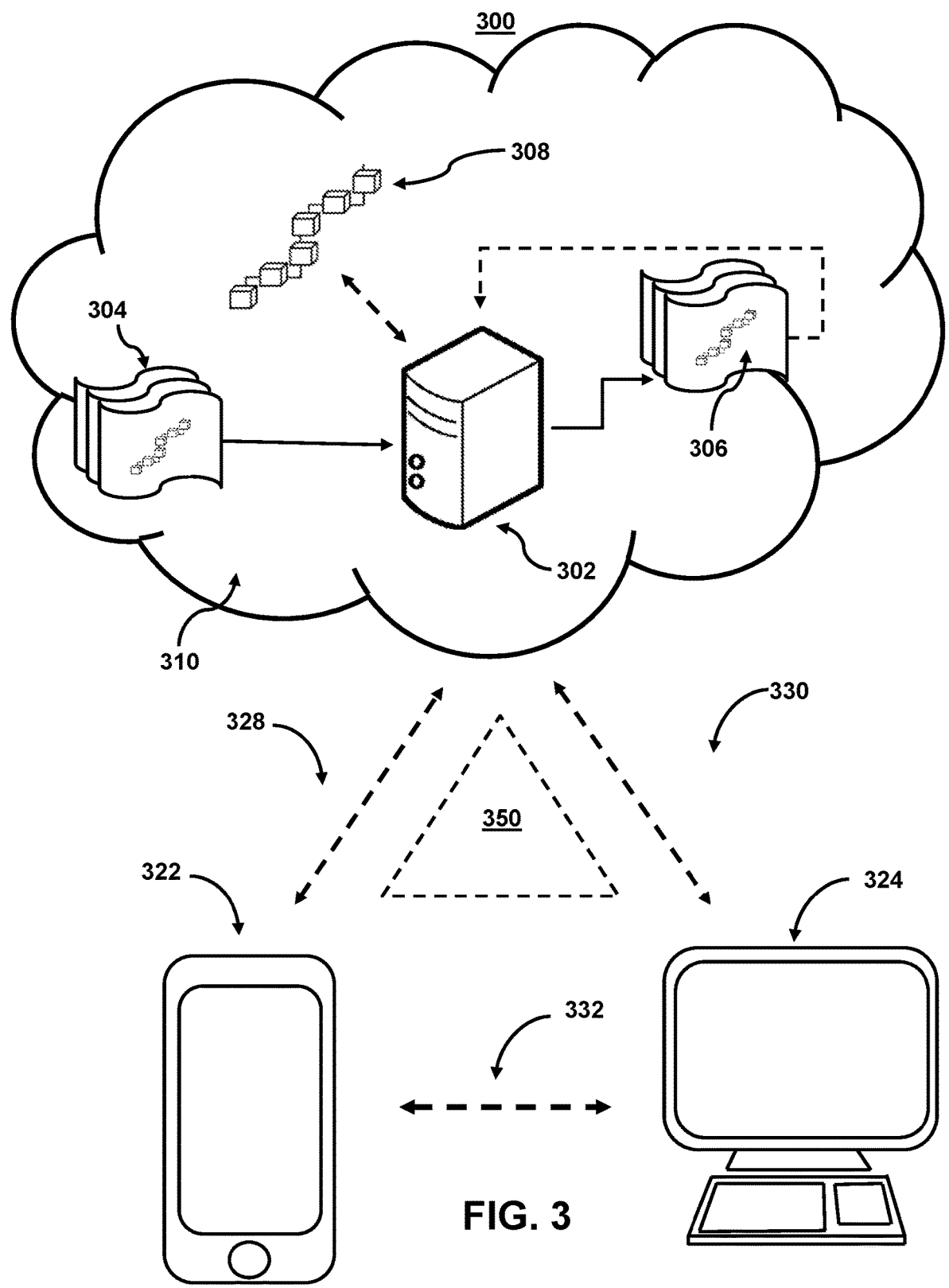
FIG. 3 shows illustrative components for a system used to communicate between devices and processors, in accordance with one or more embodiments.

FIG. 3 shows illustrative components for a system used to determine whether to generate cryptographic tokens for users, in accordance with one or more embodiments. For example, FIG. 3 may show illustrative components for detecting that a user was present at an event and estimating a probability that user will access cryptographic tokens of the event should they be generated. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include all the components of Computer System 102, On-platform Database(s) 134, Off-platform Database(s) 136, Token Valuation Database(s) 138. Cloud components 310 may access User Device(s) 104.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., the number of cryptographic tokens to be generated).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., the time delay after the end of an event to generate tokens).

In some embodiments, the model (e.g., model 302) may automatically perform actions based on outputs 306. In some embodiments, the model (e.g., model 302) may not perform any actions. The output of the model (e.g., model 302) may be used to determine whether cryptographic tokens are generated, how many cryptographic tokens are generated, and after how long of a time delay.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
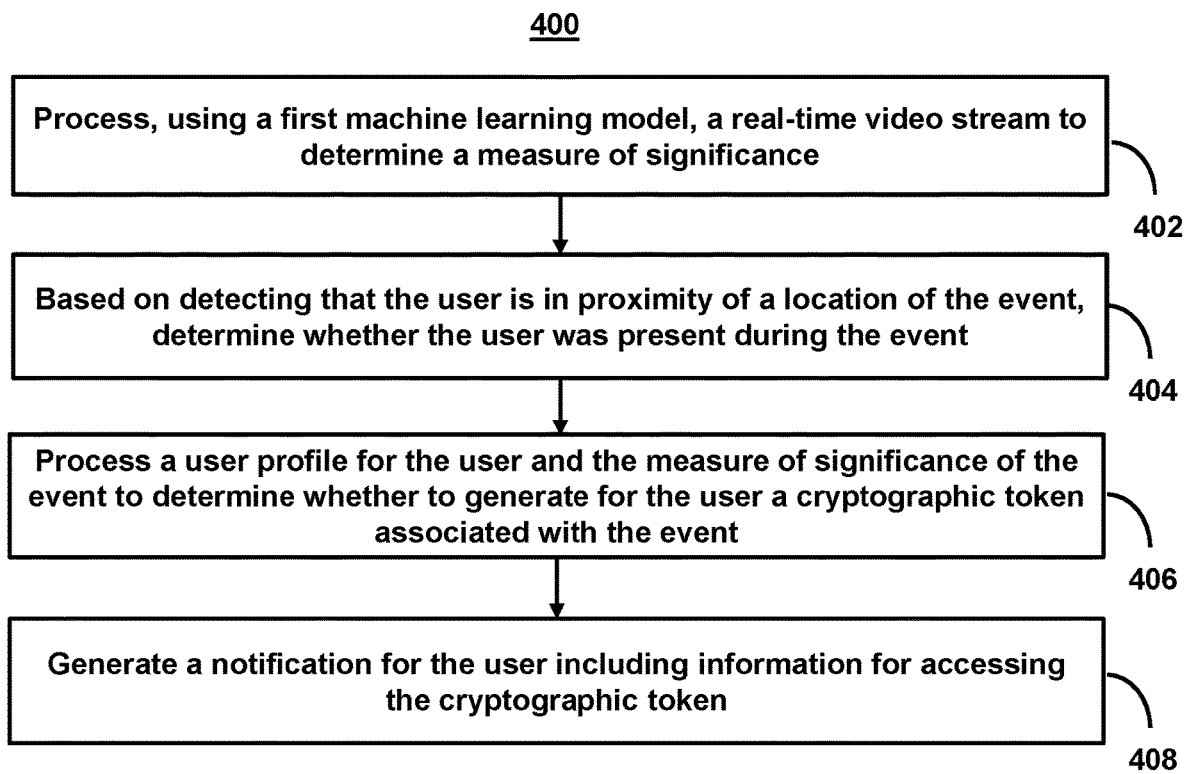
FIG. 4 shows a flowchart of the steps involved in detecting user presence at events and calculating measures of significance to generate cryptographic tokens, in accordance with one or more embodiments.

FIG. 4 shows a flowchart of the steps involved in detecting an event during a real-time video stream and determining to generate cryptographic tokens, in accordance with one or more embodiments. For example, the system may use process 400 (e.g., as implemented on one or more system components described above) in order to drive user engagement on a video streaming platform by anticipating enthusiasm for significant events and using cryptographic tokens to reward subscribers.

At step 402, process 400 (e.g., using one or more components described above) processes, using a first machine learning model, a real-time video stream to determine a measure of significance of an event depicted in the real-time video stream. To do so, the system may retrieve a first on-location dataset comprising viewership and audience engagement data and event metadata collected in real time. The system may also retrieve a first off-location dataset comprising metadata collected from sources other than a platform on which the real-time video stream is hosted. The system may then input to the first machine learning model the real-time video stream, the first on-location dataset, and the first off-location dataset. The system may use one or more algorithms to process one or more of the real-time video stream, the first on-location dataset, and the first off-location dataset. For example, the system may input the raw data from the real-time video stream into a first algorithm to get visual, event-driven information with keyframes in real time. The system may use a second algorithm identify twitter streams associated with the event and log key events associated with the tweets or clips in the tweets that associate with video data, accounting for a time lag between tweets and the event. The system may use a third algorithm to identify change in volumes of tweets associated with an event. Finally, the first machine learning model may incorporate a fourth algorithm which combines the output of the first three algorithms of the model to select a starting time, an ending time, and a measure of significance of the event.

By doing so, the system may provide comprehensive input data to the model for determining key events or moments in a video stream.

As referred to herein, a measure of significance may be a vector combined from a numerical estimate for the importance of an event in a real-time video stream and associated metadata. Such associated metadata may include but is not limited to a time after the end of the event at which cryptographic tokens may be generated, and the number of cryptographic tokens to be generated.

As referred to herein, a significant event may be a portion of a real-time video stream defined by a start time and an end time. The system may determine an event to be significant based on the measure of significance. For example, the system may compare numerical estimate for the importance of the event in the measure of significance against a threshold.

The first machine learning model may produce a starting time, an ending time, and a measure of significance of an event depicted in the real-time video stream. The measure of significance may include a numerical vector indicating the expected enthusiasm surrounding the event from users who may watch the real-time video stream. In addition, the measure of significance may include an amount of cryptographic tokens to be generated and a future time to generate the cryptographic token associated with the event. For example, the measure of significance may specify that 1000 cryptographic tokens are to be issued in relation to the event, and that the cryptographic tokens are to be issued 70 hours after the end time of the event.

In some embodiments, the system may dynamically adjust the time period after which to generate the cryptographic token associated with the event if the interest in the event depicted by the cryptographic tokens is higher than expected. The system may retrieve, from a server corresponding to the location, real-time data representative of attention to the cryptographic token and determine that a revised measure of significance of the cryptographic token has increased relative to the measure of significance. The system may correspondingly adjust the measure of delay to shorten the time period between an ending time of the event and generation of the cryptographic token. By doing so, the system may issue the cryptographic tokens at the moment of greatest interest in the event.

In some embodiments, the system may choose to issue cryptographic tokens immediately subsequent to the end time of the event in the real-time video stream. The system may, for example, receive a measure of significance with a time delay of 0 indicating that cryptographic tokens may be generated and assigned immediately. In some embodiments, the system may host an auction among live viewers of the real-time video stream instead of selecting users to be eligible to receive cryptographic tokens. For example, the system may cause one or more applications on user devices associated with the platform of the event to display a notification to participate in an auction of one or more cryptographic tokens. The system may assign a set number of cryptographic tokens, which may be determined by the measure of significance, to the highest bidders in the auction. By doing so, the system may drive viewer engagement in real time through drawing attention to an unexpected event in the real-time video stream, and the system may simultaneously reward current viewers of the event and/or subscribers to the platform.

At step 404, process 400 (e.g., using one or more components described above), based on detecting that a current location of a user is in proximity of a location of the event, determines whether the user was present at the location (e.g., geographical location, virtual location, or another suitable location) during a portion of the event. The system may access the location of the user through one or more applications on a user device (e.g., a mobile device) that may track global positioning system (GPS) data, or through one or more services the user partakes in at the location. To determine whether the user was present at the location during a portion of the event, the system may access GPS location data of a mobile device of the user between a starting time and an ending time of the event through one or more mobile applications. The system may additionally retrieve from a server corresponding to the location (e.g., a streaming platform) a viewing history of the user at the location and determine a relationship of the user to a platform (e.g., whether the user has a membership on the streaming platform) and/or of the user to the event (e.g., whether the user purchased tickets to the event). The system may combine the GPS location data, the viewing history, the relationship to the platform and to the event of the user into a user presence vector and process the user presence vector using a program to determine whether the user was present at the location between the starting time and the ending time for the event. In some embodiments, the system may use deterministic rules and/or a machine learning model on the presence vector to do so.

At step 406, process 400 (e.g., using one or more components described above), based on determining that the user was present at the location during the portion of the event, processes a user profile for the user and the measure of significance of the event to determine whether to generate for the user a cryptographic token associated with the event. To do so, the system may process the user profile to generate an interest matrix for the user and then process, using a second machine learning model, the interest matrix and the measure of significance of the event to determine a probability the user will access the cryptographic token associated with the event. The interest matrix may be indicative of how compatible the event is with the user's tastes and may be generated using data within the user profile (e.g., the user's viewing history, any subscriptions or memberships, etc.). The measure of significance may be indicative of how much the event itself may pique the interest of viewers. By taking both factors into consideration, the system may obtain a more accurate gauge on how much the user may be interested in cryptographic tokens of the event. The system may determine whether to generate for the user the cryptographic token associated with the event based on whether the probability exceeds a preset threshold.

At step 408, process 400 (e.g., using one or more components described above), based on determining to generate for the user the cryptographic token associated with the event, generates a notification to the user including information for accessing the cryptographic token for the user. The system may assign the cryptographic token to a cryptography-based storage application and communicate with an application on a user device to indicate an address for the cryptography-based storage application and instructions for generating one or more private keys of the cryptography-based storage application. The system may give ownership of the cryptography-based storage application to the user; the user controls the cryptography-based storage application via the private keys. In some embodiments, the user may be charged for the cryptographic tokens. The system may record in a token valuation database that the cryptographic token has been assigned to the user.

The system may monitor a status of the cryptographic token over a period of time to determine a measure of appreciation for the cryptographic token. In some embodiments, the measure of appreciation may be the resale price of the cryptographic token. The system may record the measure of appreciation in the token valuation database. The system may use the token valuation database as continuous training data for the first machine learning model. By doing so, the system may continually reinforce the model's accuracy in pricing and evaluating cryptographic tokens of events in real-time video streams. The system may also use the measure of significance received from the first machine learning model as continuous training data for a second machine learning model.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising processing, using a first machine learning model, a real-time video stream to determine a measure of significance of an event depicted in the real-time video stream; at a subsequent time, based on detecting that a current location of a user is in proximity of a location of the event, determining whether the user was present at the location during a portion of the event; based on determining that the user was present at the location during the portion of the event, processing a user profile for the user and the measure of significance of the event to determine whether to generate for the user a cryptographic token associated with the event; and based on determining to generate for the user the cryptographic token associated with the event, generating a notification to the user including information for accessing the cryptographic token for the user.

2. The method of any one of the preceding embodiments, wherein processing, using the first machine learning model, a real-time video stream comprises: retrieving a first on-location dataset comprising viewership and audience engagement data and event metadata collected in real time; retrieving a first off-location dataset comprising metadata collected from sources other than a platform on which the real-time video stream is hosted; and inputting to the first machine learning model the real-time video stream, the first on-location dataset, and the first off-location dataset.

3. The method of any one of the preceding embodiments, wherein the measure of significance of the event further comprises an amount of cryptographic tokens to be generated.

4. The method of any one of the preceding embodiments, wherein determining whether the user was present at the location during a portion of the event comprises: accessing global positioning system (GPS) location data of a mobile device of the user between a starting time and an ending time of the event through one or more mobile applications; retrieving from a server corresponding to the location a viewing history of the user at the location; determining a relationship of the user to a platform and/or of the user to the event; combining the GPS location data, the viewing history, the relationship to the platform and to the event of the user into a user presence vector; and processing the user presence vector using a program to determine whether the user was present at the location between the starting time and the ending time for the event.

5. The method of any one of the preceding embodiments, wherein processing the user profile for the user and the measure of significance of the event to determine whether to generate for the user the cryptographic token associated with the event comprises: processing the user profile to generate an interest matrix for the user; processing, using a second machine learning model, the interest matrix and the measure of significance of the event to determine a probability the user will access the cryptographic token associated with the event; and determining whether to generate for the user the cryptographic token associated with the event based on whether the probability exceeds a preset threshold.

6. The method of any one of the preceding embodiments, wherein the measure of significance of the event further comprises a future time to generate the cryptographic token associated with the event.

7. The method of any one of the preceding embodiments, further comprising determining a time period after which to generate the cryptographic token associated with the event, comprising: retrieving, from a server corresponding to the location, real-time data representative of attention to the cryptographic token; determine that a revised measure of significance of the cryptographic token has increased relative to the measure of significance; and adjust the measure of delay to shorten the time period between an ending time of the event and generation of the cryptographic token.

8. The method of any one of the preceding embodiments, wherein generating the notification to the user including information for accessing the cryptographic token for the user comprises: assigning the cryptographic token to a cryptography-based storage application; communicating with an application on a user device to indicate an address for the cryptography-based storage application and instructions for generating one or more private keys of the cryptography-based storage application; and recording in a token valuation database that the cryptographic token has been assigned to the user.

9. The method of any one of the preceding embodiments, further comprising: monitoring a status of the cryptographic token over a period of time to determine a measure of appreciation for the cryptographic token; and
recording the measure of appreciation in the token valuation database.

10. The method of any one of the preceding embodiments, further comprising: using the measure of significance received from the first machine learning model as continuous training data for a second machine learning model; and using the token valuation database as continuous training data for the first machine learning model.

11. A non-transitory, computer-readable medium comprising instructions that, when executed by one or more processors, cause operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating real-time location-based notifications in a mobile application, the system comprising:
one or more processors; and
a non-transitory, computer-readable medium comprising instructions that, when executed by the one or more processors, cause operations comprising:
processing, using a first machine learning model, a real-time video stream to determine a starting time, an ending time, and a measure of significance of an event depicted in the real-time video stream, the event being associated with a geographical location;
at a subsequent time, in response to detecting that a current geographical location of a user is in proximity of the geographical location of the event, determining whether the user was present at the geographical location between the starting time and the ending time for the event;
in response to determining that the user was present at the geographical location between the starting time and the ending time for the event, processing, using a second machine learning model, a user profile for the user and the measure of significance of the event to determine whether to generate for the user a cryptographic token associated with the event, the cryptographic token including a link to a video clip of the event from the real-time video stream; and
in response to determining to generate for the user the cryptographic token associated with the event, generating in real-time a notification to the user including information for accessing the cryptographic token for the user.

2. A method, the method comprising:
processing, using a first machine learning model, a real-time video stream to determine a measure of significance of an event depicted in the real-time video stream;
at a subsequent time, based on detecting that a current location of a user is in proximity of a location of the event, determining whether the user was present at the location during a portion of the event;
based on determining that the user was present at the location during the portion of the event, processing a user profile for the user and the measure of significance of the event to determine whether to generate for the user a cryptographic token associated with the event; and
based on determining to generate for the user the cryptographic token associated with the event, generating a notification to the user including information for accessing the cryptographic token for the user.

3. The method of claim 2, wherein processing, using the first machine learning model, a real-time video stream comprises:
retrieving a first on-location dataset comprising viewership and audience engagement data and event metadata collected in real time;
retrieving a first off-location dataset comprising metadata collected from sources other than a platform on which the real-time video stream is hosted; and
inputting to the first machine learning model the real-time video stream, the first on-location dataset, and the first off-location dataset.

4. The method of claim 2, wherein the measure of significance of the event further comprises an amount of cryptographic tokens to be generated.

5. The method of claim 2, wherein determining whether the user was present at the location during a portion of the event comprises:
accessing global positioning system (GPS) location data of a mobile device of the user between a starting time and an ending time of the event through one or more mobile applications;
retrieving from a server corresponding to the location a viewing history of the user at the location;
determining a relationship of the user to a platform and/or of the user to the event;
combining the GPS location data, the viewing history, the relationship to the platform and to the event of the user into a user presence vector; and
processing the user presence vector using a program to determine whether the user was present at the location between the starting time and the ending time for the event.

6. The method of claim 2, wherein processing the user profile for the user and the measure of significance of the event to determine whether to generate for the user the cryptographic token associated with the event comprises:
processing the user profile to generate an interest matrix for the user;
processing, using a second machine learning model, the interest matrix and the measure of significance of the event to determine a probability the user will access the cryptographic token associated with the event; and
determining whether to generate for the user the cryptographic token associated with the event based on whether the probability exceeds a preset threshold.

7. The method of claim 2, wherein the measure of significance of the event further comprises a future time to generate the cryptographic token associated with the event.

8. The method of claim 2, further comprising determining a time period after which to generate the cryptographic token associated with the event, comprising:
retrieving, from a server corresponding to the location, real-time data representative of attention to the cryptographic token;
determine that a revised measure of significance of the cryptographic token has increased relative to the measure of significance; and
adjust the measure of delay to shorten the time period between an ending time of the event and generation of the cryptographic token.

9. The method of claim 2, wherein generating the notification to the user including information for accessing the cryptographic token for the user comprises:
assigning the cryptographic token to a cryptography-based storage application;
communicating with an application on a user device to indicate an address for the cryptography-based storage application and instructions for generating one or more private keys of the cryptography-based storage application; and
recording in a token valuation database that the cryptographic token has been assigned to the user.

10. The method of claim 9, further comprising:
monitoring a status of the cryptographic token over a period of time to determine a measure of appreciation for the cryptographic token; and
recording the measure of appreciation in the token valuation database.

11. The method of claim 9, further comprising:
using the measure of significance received from the first machine learning model as continuous training data for a second machine learning model; and
using the token valuation database as continuous training data for the first machine learning model.

12. A non-transitory computer-readable medium comprising instructions that, when executed by one or more processors, cause operations comprising:
receiving a starting time, an ending time, and a measure of significance of an event depicted in a video stream;
in response to detecting that a current location of a user is in proximity of a location of the event, determining whether the user was present at the location between the starting time and the ending time for the event;
in response to determining that the user was present at the location between the starting time and the ending time for the event, processing, using a machine learning model, a user profile for the user and the measure of significance of the event to determine whether to generate for the user a cryptographic token associated with the event; and
in response to determining to generate for the user the cryptographic token associated with the event, generating a notification to the user including information for accessing the cryptographic token for the user.

13. The non-transitory computer-readable medium of claim 12, wherein processing, using a first machine learning model, a real-time video stream comprises:
retrieving a first on-location dataset comprising viewership and audience engagement data and event metadata collected in real time;
retrieving a first off-location dataset comprising metadata collected from sources other than a platform on which the real-time video stream is hosted; and
inputting to the first machine learning model the real-time video stream, the first on-location dataset, and the first off-location dataset.

14. The non-transitory computer-readable medium of claim 12, wherein the measure of significance of the event further comprises an amount of cryptographic tokens to be generated.

15. The non-transitory computer-readable medium of claim 12, wherein determining whether the user was present at the location during a portion of the event comprises:
accessing global positioning system (GPS) location data of a mobile device of the user between a starting time and an ending time of the event through one or more mobile applications;
retrieving from a server corresponding to the location a viewing history of the user at the location;
determining a relationship of the user to a platform and/or of the user to the event;
combining the GPS location data, the viewing history, the relationship to the platform and to the event of the user into a user presence vector; and
processing the user presence vector using a program to determine whether the user was present at the location between the starting time and the ending time for the event.

16. The non-transitory computer-readable medium of claim 12, wherein processing the user profile for the user and the measure of significance of the event to determine whether to generate for the user the cryptographic token associated with the event comprises:
processing the user profile to generate an interest matrix for the user;
processing, using a second machine learning model, the interest matrix and the measure of significance of the event to determine a probability the user will access the cryptographic token associated with the event; and
determining whether to generate for the user the cryptographic token associated with the event based on whether the probability exceeds a preset threshold.

17. The non-transitory computer-readable medium of claim 12, wherein the measure of significance of the event further comprises a future time to generate cryptographic tokens associated with the event.

18. The non-transitory computer-readable medium of claim 12, further comprising determining a time period after which to generate the cryptographic token associated with the event, comprising:
retrieving, from a server corresponding to the location, real-time data representative of attention to the cryptographic token;
determine that a revised measure of significance of the cryptographic token has increased relative to the measure of significance; and
adjust the measure of delay to shorten the time period between an ending time of the event and generation of the cryptographic token.

19. The non-transitory computer-readable medium of claim 12, wherein generating the notification to the user including information for accessing the cryptographic token for the user comprises:
communicating with an application on a user device to indicate an address for a cryptography-based storage application and instructions for generating one or more private keys of the cryptography-based storage application, wherein the cryptography-based storage application controls the cryptographic token;

monitoring a status of the cryptographic token over a period of time to determine a measure of appreciation for the cryptographic token; and recording the measure of appreciation in a token valuation database.

20. The non-transitory computer-readable medium of claim 19, further comprising:

using the measure of significance as continuous training data for a second machine learning model; and using the token valuation database as continuous training data for a first machine learning model.

* * * * *